United States Patent [19]
Hu et al.

[11] Patent Number: 5,898,903
[45] Date of Patent: Apr. 27, 1999

[54] MULTIPLE ADDRESS RADIO SYSTEM HAVING AUTOMATIC RADIO CALIBRATION FOR REDUCING FREQUENCY OFFSET BETWEEN RADIO FREQUENCY CARRIERS

[75] Inventors: Chorng-Luh Hu, San Jose; Randy Wu, Saratoga, both of Calif.

[73] Assignee: Alligator Communications, Inc., Santa Clara, Calif.

[21] Appl. No.: 08/616,072

[22] Filed: Mar. 14, 1996

[51] Int. Cl.$^6$ ...................................................... H04B 7/14
[52] U.S. Cl. .............................. 455/20; 455/69; 455/75; 455/76
[58] Field of Search .................................. 455/50.1, 51.1, 455/67.1, 67.6, 68, 69, 75, 67.3, 67.4, 71, 78, 83, 126, 127; 331/176, 177

[56] References Cited

U.S. PATENT DOCUMENTS

| | | | |
|---|---|---|---|
| H1217 | 8/1993 | Phelps | 324/326 |
| 4,901,368 | 2/1990 | Arnold et al. | 455/69 |
| 4,921,467 | 5/1990 | Lax | 455/264 |
| 4,932,072 | 6/1990 | Toko | 455/76 |
| 5,471,657 | 11/1995 | Gharpuray | 455/12.1 |
| 5,477,194 | 12/1995 | Nagakura | 331/176 |
| 5,493,710 | 2/1996 | Takahara et al. | 455/75 |
| 5,542,095 | 7/1996 | Petranovich | 455/71 |
| 5,613,193 | 3/1997 | Ishakawa et al. | 455/12.1 |

OTHER PUBLICATIONS

Article titled "EFM Units Monitor Gas Flow" published in Pipeline & Gas Journal Feb. 1994.
Brochure titled Model 1888 MAS Remote Transceiver was published by Alligator Communications, Inc. Prior to Mar. 10, 1995.
Article titled "Alligator Remote MAS Radios offer 'Over-the-Air' Monitoring And Control" published by Alligator Communications, Inc. prior to Mar. 10, 1995.
Brochure titled Model 1800 Master Station Radio published by Alligator Communications, Inc. Prior to Mar. 10, 1995.

*Primary Examiner*—Reinhard J. Eisenzopf
*Assistant Examiner*—Sam Bhattacharya
*Attorney, Agent, or Firm*—Jack M. Wiseman

[57] ABSTRACT

A multiple address radio network in which there is a central station and remote radio sites. The central station transmits control and data acquisition signals to the radios at the remote radio sites and the radios at the remote radio sites transmit to the central station acquired data. Each remote radio has an automatic frequency calibration circuit for adjusting its associated remote radio to reduce frequency offset between the radio frequency carrier transmitted by the remote radio and the radio frequency carrier transmitted by the central station by adjusting the temperature compensated crystal oscillator of the automatic frequency calibration circuit. Toward this end, a microprocessor of the frequency calibration circuit detects and measures the offset frequency and controls a digital potentiometer for adjusting the temperature compensated crystal oscillator.

21 Claims, 5 Drawing Sheets fig-2

MULTIPLE ADDRESS RADIO SYSTEM HAVING AUTOMATIC RADIO CALIBRATION FOR REDUCING FREQUENCY OFFSET BETWEEN RADIO FREQUENCY CARRIERS

BACKGROUND OF THE INVENTION

The present invention relates in general to multiple address radio systems and, more particularly, to a multiple address radio system having automatic radio frequency calibration.

In earlier multiple address systems between the central station and the remote radio sites, technicians were required to visit remote sites for calibration and adjustment of the frequency offset of the remote radio at the remote radio sites.

Temperature compensated crystal oscillators have been employed in the transmission of radio frequency signals from a central station and from the remote radios at the remote radio sites. Over a period of time, temperature compensated crystal oscillator frequencies may vary. The variations in the oscillation frequencies for temperature compensated crystal oscillators are not consistent, or the same. Therefore, the output radio frequency of the central station and the output radio frequency of a remote radio at a remote radio site may vary. In narrow band channels, a radio frequency offset between a central station and a remote radio at a remote radio site tend to degrade data communication quality.

Remote radios at remote radio sites have employed automatic radio frequency control. In the use of automatic radio frequency control, a voltage at the remote radio site is sampled and temporarily held in order to change the bias voltage of the temperature compensated crystal oscillator. The bias voltage momentarily alters the output radio frequency of the temperature compensated crystal oscillator. For a remote transceiver radio which changes between a receive state and a transmit state continuously while being polled, a delay in the automatic radio frequency control can increase the bit error rate. At fringe areas in which the signal strength from the master station is weak, a remote transceiver radio using automatic radio frequency control may tend to track and lock onto an incorrect central station.

SUMMARY OF THE INVENTION

A multiple address radio system in which there is radio frequency transmission between a central or master station and remote transceiver radios at remote radio sites. An automatic frequency calibration circuit in a remote transceiver radio at a remote radio site measures the frequency offset between the radio frequency carrier transmitted by the central station and the radio frequency carrier transmitted by the remote transceiver radio and adjusts the transmission crystal oscillator of the remote transceiver radio in order for the radio frequency carrier transmitted from the remote transceiver radio to match the radio frequency carrier transmitted from the central or master station.

An object of the present invention is to ensure that the radio transmission offset between a central station and a remote transceiver radio at a remote radio site in a multiple address radio system does not become excessive.

Another object of the:present invention is to improve the quality of control and data transmission between a central station and remote radio sites in a multiple address radio system.

Another object of the present invention is to avoid a remote transceiver radio at a remote radio site in a multiple address radio system from tracking or locking onto an incorrect central station.

Another object of the present invention is to provide a multiple address radio system in which there is calibration and adjustment of the radio frequency carriers between a remote transceiver radio at a remote radio site and a central or master station for reducing the radio frequency offset therebetween without the presence of an operator or technician at the remote radio site.

A feature of the present invention is that a remote transceiver radio at the remote radio site calibrates its time base with the time base of a central station by measuring its radio frequency carrier against the radio frequency carrier of the central station and, each time the frequency offset therebetween exceeds a predetermined frequency, the remote transceiver radio at the remote radio site makes an adjustment to its time base.

DESCRIPTION OF THE PREFERRED EMBODIMENT

Figure 1:
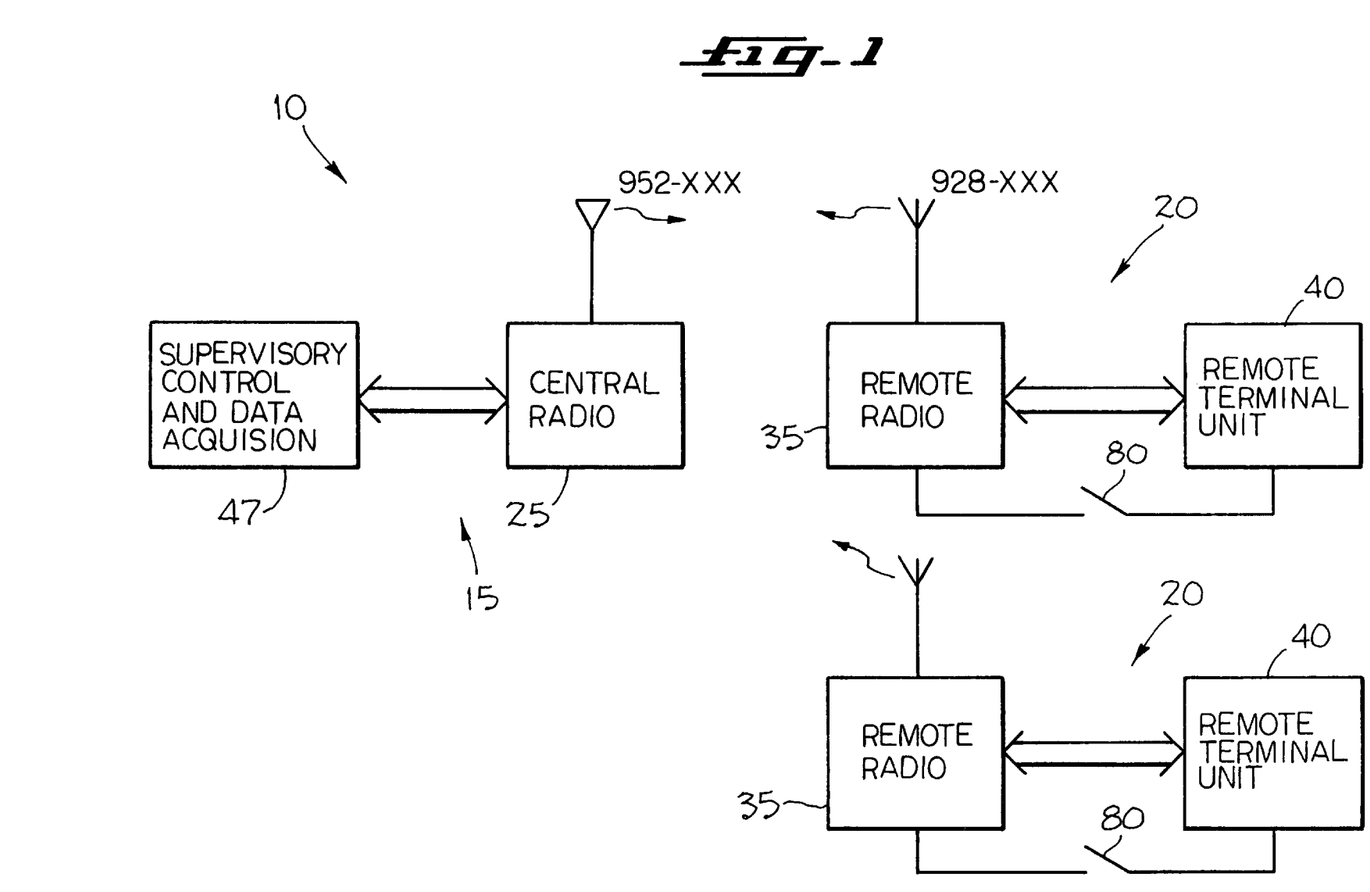
FIG. 1 is a diagrammatic illustration of a multiple address radio system.

Illustrated in FIG. 1 is a multiple address system 10. Multiple address systems are used for oil and gas pipeline monitoring, utility data communications, railroad data communications, water systems, and the like to retrieve information from remote radios at remote radio sites by a central station. The central station also exercises supervisory control in the data acquisition from the remote radios.

The multiple address unit 10 comprises a central or master station 15 and a plurality of remote radio sites 20. The central station 15 includes a suitable transceiver radio 25, such as the Alligator Model 1800 manufactured by Alligator Communications, Inc. of Sunnyvale, Calif. A suitable microprocessor 45 (FIG. 2) is employed to select the output carrier frequency $f_1$ of the transceiver radio 25, such as the MC68HC711 microprocessor manufactured by Motorola, Inc. of Phoenix, Ari. In the preferred embodiment, a suitable supervisory control and data acquisition system 47 is employed to transmit through the transceiver radio 25 supervisory and control signals. Such a supervisory control and data acquisition system is manufactured by Valmet Automation, of Houston, Tex., Model No. OASYS. The transceiver radio 25 is a computer or microprocessor controlled transceiver radio. The central station 15 operates as the status, diagnostic and control center for the multiple address radio system 10. In the exemplary embodiment, the radio frequency carrier output of the transceiver radio 25 is approximately 952 megahertz.

Each remote radio site 20 comprises a suitable remote transceiver radio 35, such as the remote Alligator transceiver radio Model 1888 manufactured by Alligator Communications, Inc. of Sunnyvale, Calif. Connected to each remote transceiver radio 35 is a suitable remote terminal unit 40, such as the remote terminal unit manufactured by Valmet Automation of Houston, Tex., as Model No. MICRO-IC. In the exemplary embodiment, the radio frequency carrier output of the remote transceiver radio 35 is approximately 928 megahertz. The remote terminal unit 40 serves to collect data and to store data to be retrieved by the central station 25 via its associated remote transceiver radio 35 and, also, to perform the command from the central station 15.

Figure 2:
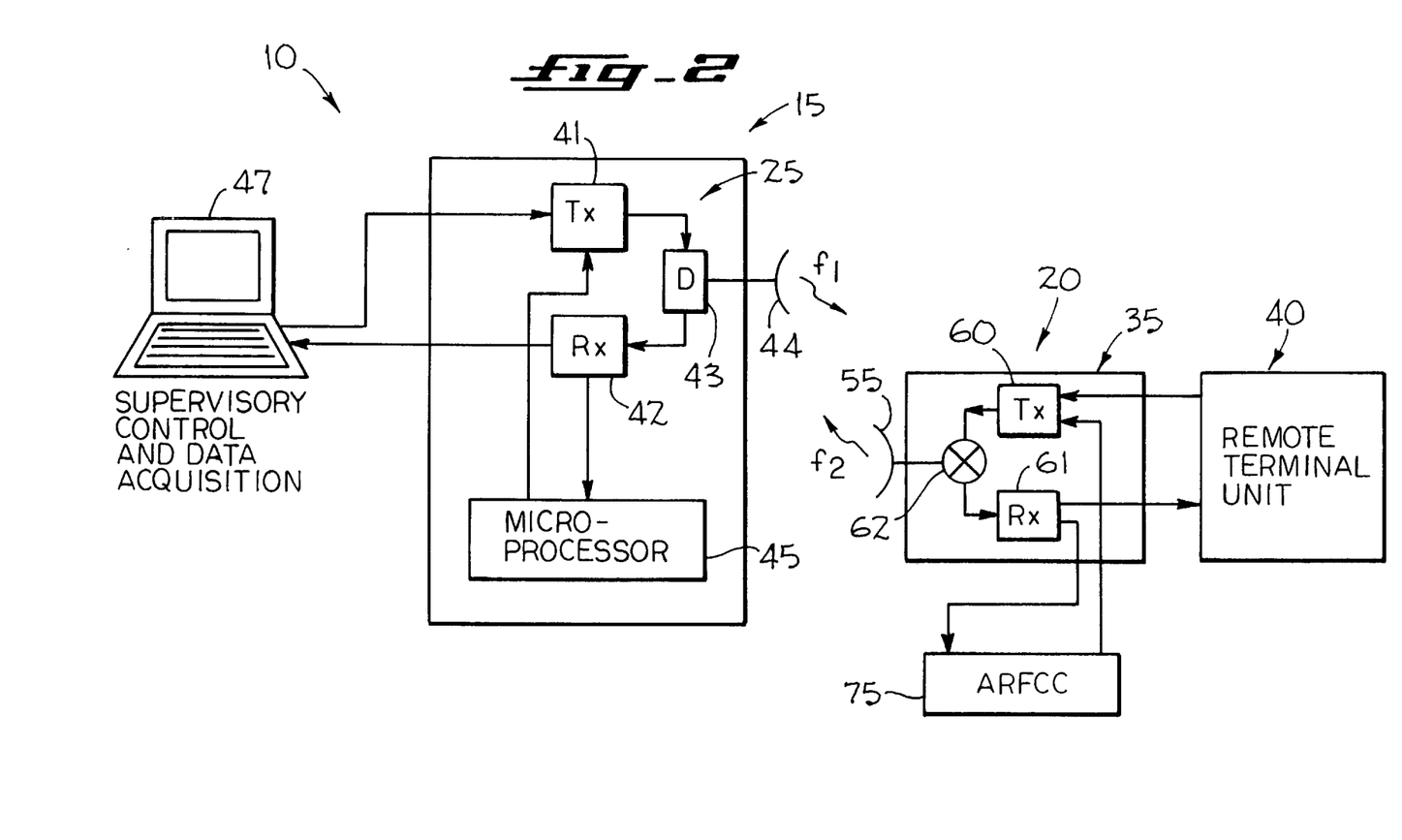
FIG. 2 is a diagrammatic illustration of a multiple address system illustrating a central station and a remote radio site.

As shown in FIG. 2, the transceiver 25 for the central station 15 includes a suitable transmitter 41 with a temperature compensated crystal oscillator and a suitable receiver 42. Connected to the output of the transmitter 42 is a suitable duplexer 43. The output of the duplexer 43 is connected to a suitable antenna 44 for transmitting to the remote transceiver radios 35 at the remote radio sites 20 control signals and signals for the acquisition of data. The duplexer 43 is connected to the input of the receiver 42. Incoming data transmitted from a remote transceiver radio 35 is received by the antenna 44 and is fed to the receiver 42 by way of the duplexer 43. Incoming data fed to the receiver 42 are displayed on the supervisory control and data acquisition system 47. Supervisory control and data acquisition signals are applied to the transmitter 41 under the control of the supervisory control and data acquisition system 47 to be received by the remote terminal unit 40 through its associated remote transceiver radio 35.

The transmitter 41 transmits, a radio frequency carrier $f_1$ through the duplexer 43 and an antenna 44. In the exemplary embodiment, the radio frequency carrier transmitted by the transmitter 41 is approximately 952 megahertz. The remote transceiver radio 35 receives the transmitted radio frequency carrier $f_1$ from the central radio station via its antenna 55. The remote transceiver radio 35 comprises a suitable transmitter 60 and a suitable receiver 61. A suitable transmission line 62, such as a ¼ wavelength transmission line, protects the receiver 61 during the transmission of radio frequency signals $f_2$ by the transmitter 60. The transmission line 62 changes the remote transceiver radio 35 between a receive state and a transmit state continuously while the remote terminal unit 40 is being polled.

A microprocessor 70 of an automatic radio frequency calibration circuit 75 (FIG. 3) is provided for each remote transceiver radio 35 to select the output radio frequency carrier for the transmitter 60. While reference herein is made to a microprocessor 70, as the preferred embodiment, it is to be understood that a central processing unit or a computer may also perform the function herein described for the microprocessor 70. The microprocessor 70 is of the type manufactured by Motorola, Inc. of Phoenix, Ariz., as the MC68HC711 microprocessor. The transmitter 60 of the remote transceiver radio 35 transmits a radio frequency carrier $f_2$ through the antenna 55 (FIG. 2). The radio frequency carrier $f_2$ transmitted by the antenna 55 of the remote transceiver radio 35 is detected by the antenna 44 of the central station 15 and is applied to the duplexer 43. Data stored in the remote terminal unit 40 are applied to the receiver 42 of the transceiver radio 25 of the central station 15 for display on the supervisory control and data acquisition system 47.

The multiple address system 10 uses a single central or master radio transceiver 25 transmitting with a radio frequency carrier $f_1$ and a plurality of remote transceiver radios transmitting with a radio frequency carrier $f_2$. In order for the central station 15 to retrieve data, the supervisory control and data acquisition controller 47 sends an address command through the central station 15 to remote transceiver radios 35 at the remote radio sites 20 (FIG. 2). The remote transceiver radios 35 advance the command to the remote terminal units 40. Only the remote terminal unit 40 with the correct address will key-in the associated transmitter 60 through a push-to-talk switch 80 (FIG. 1) to send its stored data to the central station 15 through its associated transmitter 60. Since all the remote transceiver radios 35 transmit with the same radio frequency carrier $f_2$, only one remote transceiver radio 35 will be transmitting at a given time.

The microprocessor 70 (FIG. 3) will attempt automatic frequency calibration in the manner hereinafter described. The microprocessor 70 has a primary event automatic frequency calibration counter (FIG. 4). The primary event automatic frequency calibration counter is updated just before the remote transceiver radio 35 is keyed-in by the remote terminal unit 40. If two successive offset readings, which are keyed-in by the remote terminal unit 40, are within 300 hertz of one another, in the exemplary embodiment, the primary event automatic frequency calibration counter will increase by one. If not, the primary event automatic frequency calibration counter will reset the counter. The current offset reading is always stored and compared with the next offset reading. When the count of the primary event automatic frequency calibration counter reaches a predetermined counter limit, the microprocessor 70 will attempt to adjust its frequency selection, in the exemplary embodiment, to within 200 hertz of the incoming radio frequency from the central station 15.

Figure 3:
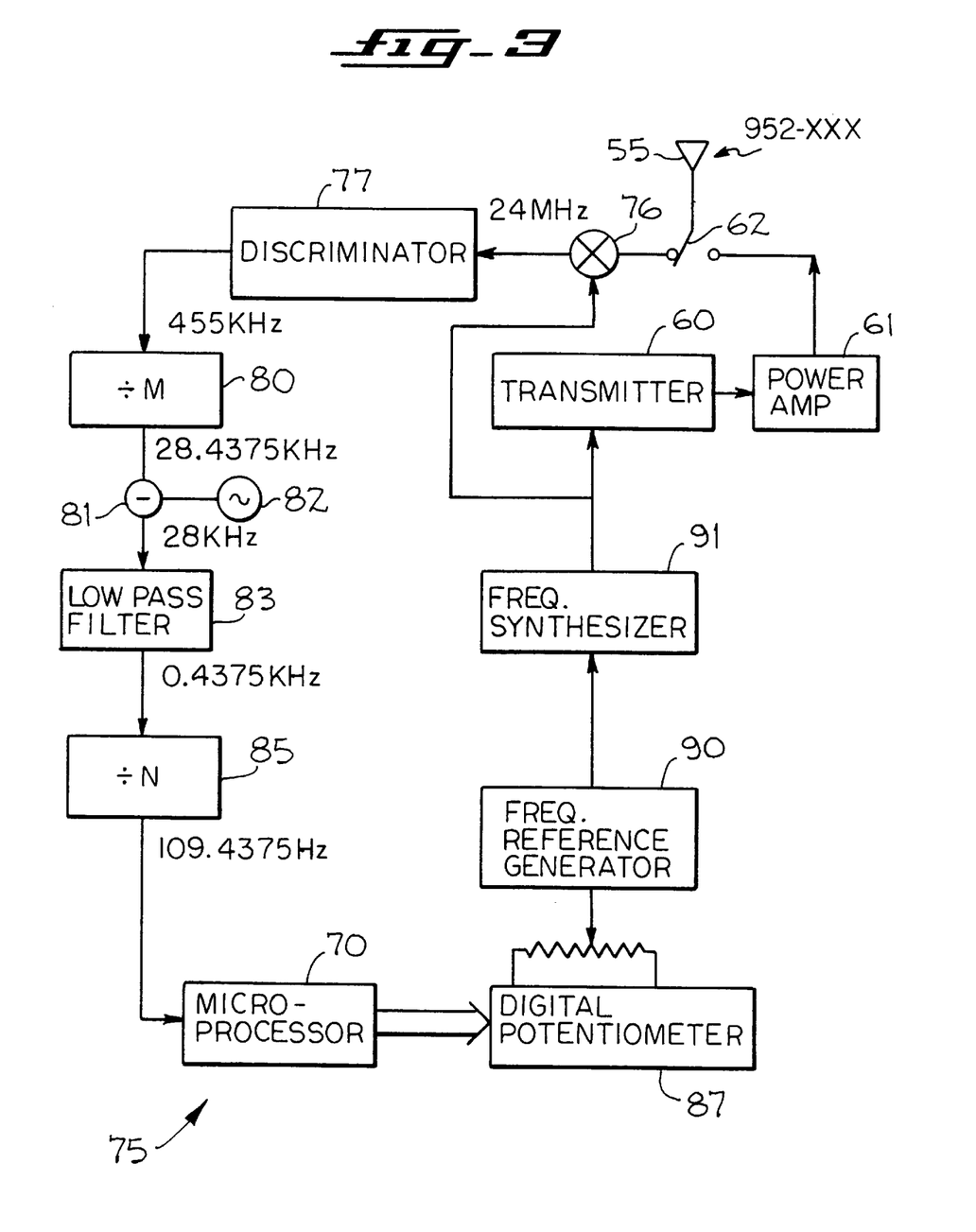
FIG. 3 is a block diagram of an automatic frequency calibration circuit employed with a remote transceiver radio at the remote radio site.
Figure 4:
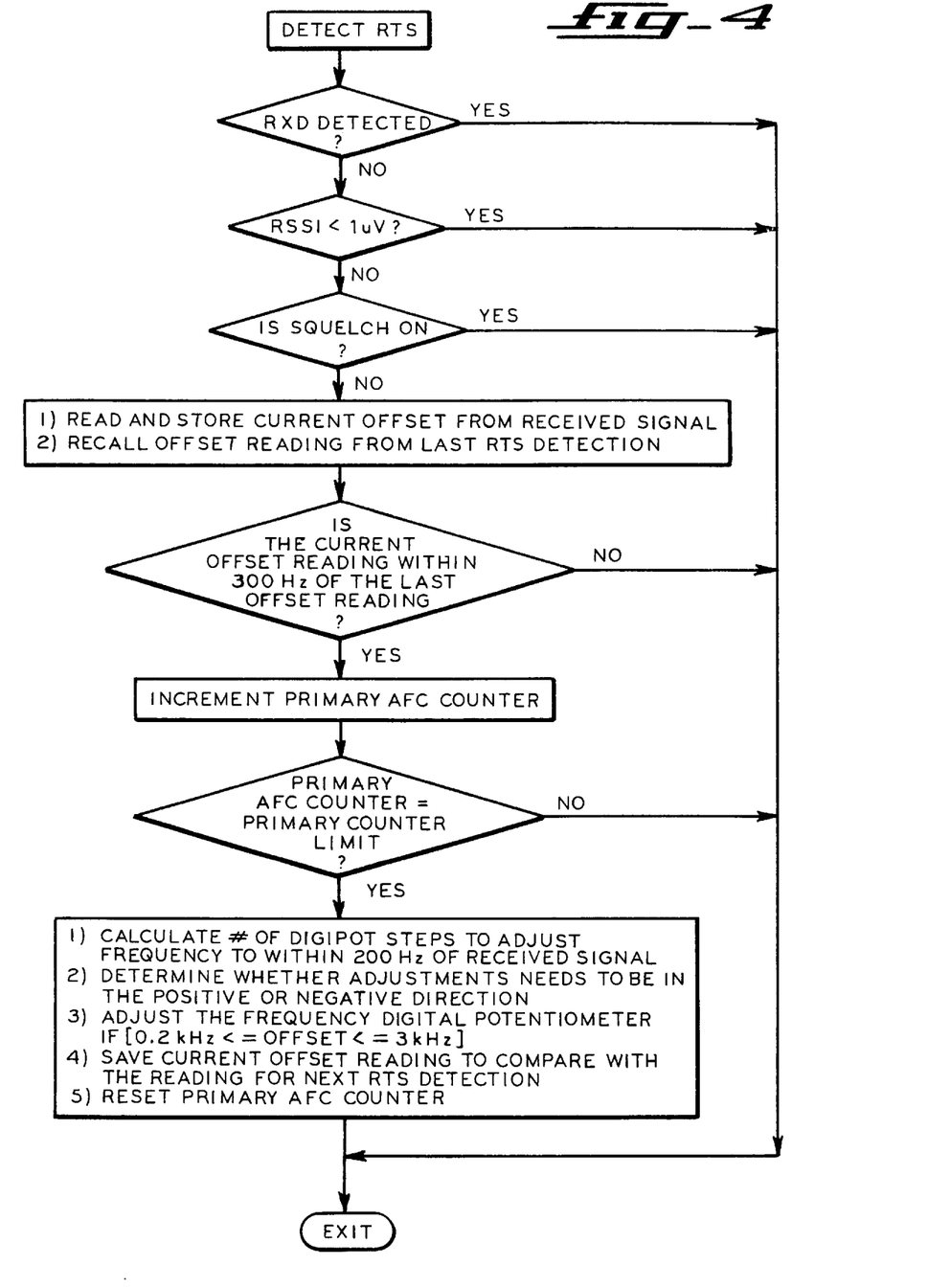
FIG. 4 is a flow chart for a microprocessor of the automatic frequency calibration circuit employing a primary event counter initiated by a remote terminal unit keying-in the remote transceiver radio.

A command to transmit data from the transmitter 60 at the remote site 20 initiated by the keying-in of the remote terminal unit 40 is detected by the microprocessor 70 (FIGS. 3 and 4). When the received signal strength carrier $f_2$ of the request to transmit data is less than 1 microvolt, in the exemplary embodiment, the microprocessor 70 does not take an offset reading. When the received signal strength of the carrier $f_2$ of the command to transmit data is equal to or greater than 1 microvolt, in the exemplary embodiment, the microprocessor 70 determines whether the receiver 61 of the remote transceiver radio 35 is in a squelch state.

Should the receiver 61 be in a squelch state, then the microprocessor 70 does not take an offset reading. Should the receiver 61 not be in a squelch state, then the microprocessor 70 reads and stores the current offset reading and recalls the offset reading from the last request to transmit data. Should the current offset reading not be within 300 hertz of the last offset reading, then the microprocessor 70 does not take an offset reading. Should the current offset reading be within 300 hertz of the last offset reading, then the microprocessor 70 increments the primary event automatic frequency calibration counter. Before the microprocesor 70 increments the primary event automatic frequency calibration counter, it updates the offset reading.

Should the primary event automatic frequency calibration counter not equal the primary event counter limit, then the microprocessor 70 will take an offset reading without making an adjustment. Should the primary event automatic frequency counter be equal to the primary counter limit, then the microprocessor 70 will take an offset reading and will adjust the frequency digital potentiometer 87 (FIG. 3). The microprocessor 70 determines whether the adjustment needs to be in the positive or negative direction. The microprocessor 70 adjusts the digital potentiometer 87 if the received offset frequency, in the exemplary embodiment, is greater than 200 hertz, or less than 3 kilohertz. After the adjustment is made, the microprocessor 70 resets the primary event automatic frequency calibration counter.

Figure 5:
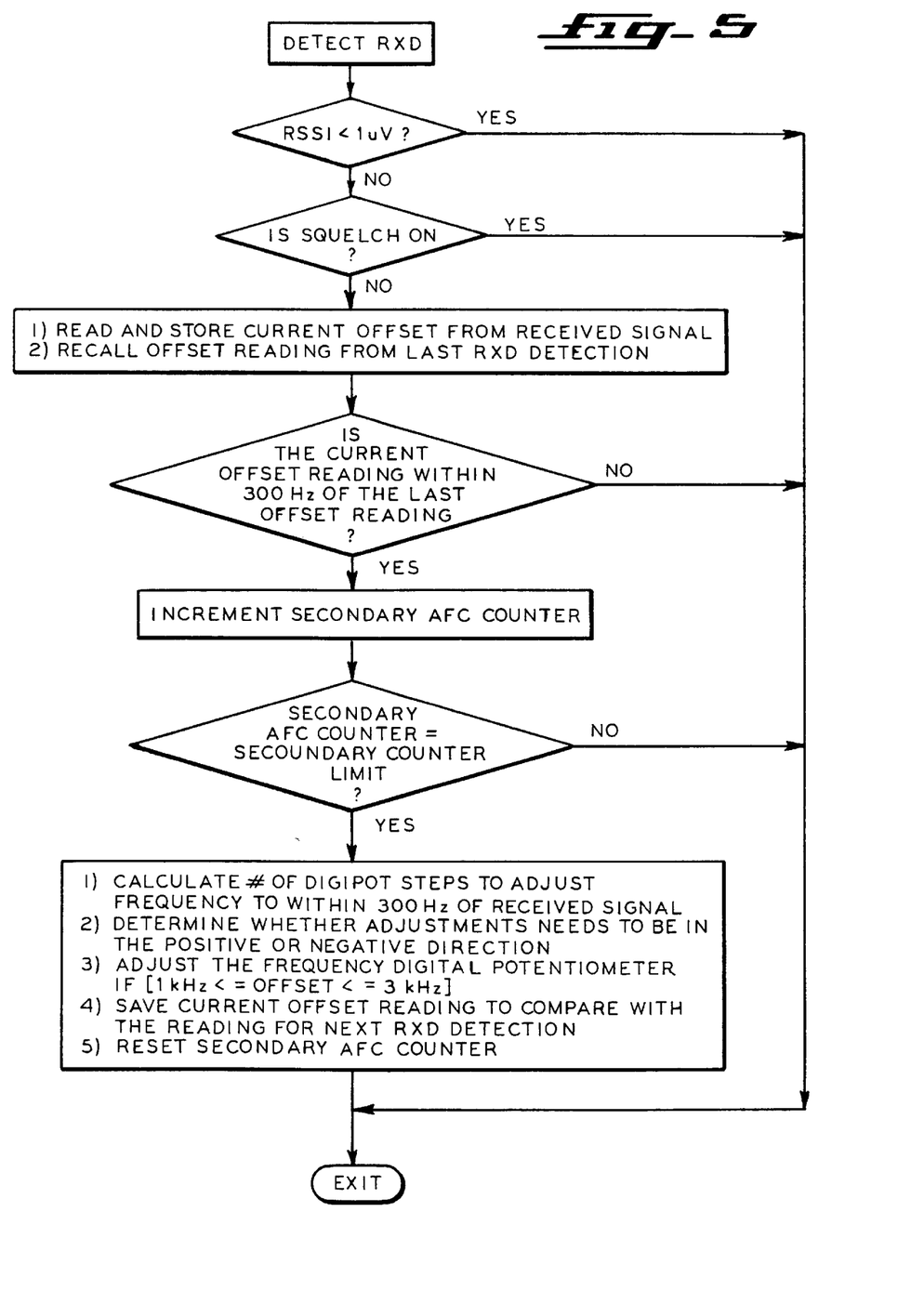
FIG. 5 is a flow chart for the microprocessor of the automatic frequency calibration circuit employing a secondary event counter initiated by the central station sending data.

The microprocessor 70 has a secondary event automatic frequency calibration counter for determining when to read the frequency offset between the central radio station radio frequency carrier $f_1$ and the addressed remote radio transmission frequency carrier $f_2$ (FIG. 5). The secondary event automatic frequency calibration counter is independent of the primary event automatic frequency calibration counter. Whenever the microprocessor 70 receives an incoming group of carrier data, the microprocessor 70 stores the current offset reading and compares it with the offset reading which was read just before the previous group of received data. If the two offset readings are not within 300 hertz of one another, the secondary event automatic frequency calibration counter will increase by one. If so, the microprocessor 70 resets the secondary event automatic frequency calibration counter. The current offset reading is saved and compared to the next offset reading. When the count of the secondary event automatic frequency calibration counter reaches the preselected secondary event automatic frequency calibration counter limits, the microprocessor 70 will attempt an adjustment of the carrier frequency output of the transmitter 60 through the automatic frequency calibration circuit 75 (FIG. 3).

The central station 15 transmits to the remote radio receiver 25 a command to send data, which is detected by the microprocessor 70 (FIG. 5). The microprocessor 70 does not take an offset reading whenever it detects the presence of data. Should no data be present, then the microprocessor 70 senses the strength of the incoming carrier. Should the signal strength of the incoming carrier be below 1 microvolt, in the exemplary embodiment, then the microprocessor 70 is instructed not take an offset reading. Should the signal strength of the incoming carrier be above 1 microvolt, in the exemplary embodiment, then the microprocessor 70 is instructed to determine whether the squelch state is "on."

When the squelch state is "on", the microprocessor 70 does not take an offset reading. Should the microprocessor 70 detect the squelch state is "off", then the microprocessor 70 reads and stores the current offset between the radio frequency carriers $f_1$ and $f_2$. Additionally, the microprocessor 70 recalls the offset reading received from the last transmission of the carrier frequencies $f_1$ and $f_2$. Should the current offset reading not be within 300 hertz of the last offset reading in the preferred embodiment, then the microprocessor 70 does not take an offset reading.

In the event the current offset reading is within 300 hertz of the last offset reading, then the microprocessor 70 increments the secondary event automatic frequency calibration counter. Before the microprocessor 70 increments the secondary event automatic frequency calibration counter, it updates the offset reading. When the secondary event automatic frequency calibration counter is not equal to the secondary event automatic frequency calibration counter limit, then the microprocessor 70 continues to take an offset reading without making an adjustment. Should the secondary event automatic frequency calibration counter equal the secondary event automatic frequency calibration counter limit, then the microprocessor 70 determines the number of incremental steps for a digital potentiometer 87 (FIG. 3) and adjusts the number of incremental steps for setting the digital potentiometer 87 so that the current offset reading and the last offset reading, in the exemplary embodiment, are within 300 hertz. The microprocessor 70 determines whether the adjustment of the digital potentiometer 87 needs to be in a positive direction or in a negative direction. The microprocessor 70 stores the current offset reading to compare the offset reading of the succeeding taking of data. Lastly, the microprocessor 70, after making the adjustment of the digital potentiometer 87, resets the secondary event automatic frequency calibration counter.

Thus, the automatic frequency calibration circuit 75, in the exemplary embodiment, will not attempt adjustment of the offset frequency when the received signal strength is less than 1 microvolt, or when the receiver 61 of the remote transceiver radio 61 is squelched, or when the offset reading is less than 200 hertz or greater than 3 kilohertz.

Illustrated in FIG. 3 is the automatic frequency calibration circuit 75 embodying the present invention. The automatic frequency calibration circuit 75 is installed in each remote transceiver radio 35 of a group of remote transceiver radios 35 and enables the time base in all the remote radio transceivers 35 at the remote radio sites 20 to be automatically calibrated, respectively, to the time base of radio frequency carrier $f_1$ of the central station 15.

The central station 15 transmits a radio frequency carrier $f_1$, which in the exemplary embodiment, is approximately 952 megahertz. All of the remote transceiver radios 35 transmit a radio frequency carrier $f_2$, which in the exemplary embodiment, is approximately 928 megahertz. The desired difference between the radio frequency carrier $f_1$ and the radio frequency carrier $f_2$, in the exemplary embodiment, is 24 megahertz. As the time base at the central station 15 and the time base of or remote radio site 20 drift, there may be a frequency variance from 24 megahertz. The difference between 24 megahertz and the actual calibrated difference between the radio frequency carrier at the central station 15 and the remote radio site may vary from 24 megahertz. It is this variation that is referred to as the frequency offset.

The radio frequency carrier $f_1$ transmitted from the central station 15 is received by the antenna 55 of the remote transceiver radio 61. A suitable mixer circuit 76 receives at one input thereof the radio frequency carrier $f_1$ from the central station 15 and receives at another input thereof the radio frequency carrier $f_2$ from a frequency synthesizer 91 of the automatic radio frequency calibration circuit 75 for the remote transceiver radio 35 at the remote radio site 20. The output signal from the mixer circuit 76 is the first intermediate frequency, which, in the exemplary embodiment, is approximately 24 megahertz.

The output frequency of the mixer circuit 76 is applied to a suitable discriminator circuit 77 of the automatic radio frequency calibration circuit 75. The output of the discriminator circuit 77 is the second intermediate frequency, which is dependent on the difference of the first intermediate frequency with respect to a predetermined frequency selected by a stable local oscillator, such as a crystal oscillator, in the discriminator circuit 77. In the exemplary embodiment, the output of the discriminator circuit 77 is approximately 455 kilohertz. The output of the discriminator circuit 77 is applied to a suitable divide by M circuit 80 of the automatic frequency calibration circuit 75. In the exemplary embodiment, the divisor is 16. The output of the divide by M circuit 80, in the exemplary embodiment, is approximately 28.4375 kilohertz.

The output of the divide by M circuit 80 is applied to one input of a suitable mixer circuit 81 for the automatic frequency calibration circuit 75. The output of a suitable stable local oscillator 82 of the automatic frequency calibration circuit 75 is applied to another input of the mixer circuit 81. In the exemplary embodiment, the local oscillator 82 is a crystal oscillator. In the exemplary embodiment, the output signal from the divide by M circuit 80 is approximately 28.4375 kilohertz and the output of the local oscillator 82, in the exemplary embodiment, is 28 kilohertz. The output of the mixer circuit 81, in the exemplary embodiment is approximately 0.4375 kilohertz, which is applied to a suitable low pass filter 83 of the automatic frequency calibration circuit 75. In turn, the output of the low pass filter 83 is applied to a divide by N circuit 85 of the automatic frequency calibration circuit 75. In the preferred embodiment, the divide by N circuit 85 is a divide by four circuit. The output frequency of the divide by N circuit 85, in the exemplary embodiment, is approximately 109.4375 hertz. The frequency variation of the divide by N circuit 85 from the 109.4375 hertz signal represents the offset frequency.

Connected to the output of the divide by N circuit 85 is the microprocessor 70. The microprocessor 70 detects and measures the variation frequency from the output of the divide by N circuit 85, which is representative of the offset frequency, and controls the effective resistance of the suitable digital potentiometer 87 to compensate for the offset frequency outside of a predetermined range. It is preferred that the frequency offset be less than 0.3 kilohertz. The digital potentiometer 87 is of the type manufactured by XICOR of Milpitas, Calif., as digital potentiometer X9313.

Connected to the digital potentiometer 87 is a suitable frequency generator 90 of the automatic radio frequency calibration circuit 75. The frequency generator 90 provides a time base. In the preferred embodiment, the frequency controlled generator 90 is a temperature compensated crystal oscillator. The digital potentiometer 87 controls the output frequency of the temperature compensated crystal oscillator by adjusting the bias voltage, which regulates the output frequency of the frequency generator 90, to correct any offset frequency beyond the predetermined range. In this manner, the time base of the transmitter 60 of the remote transceiver radio 35 at the remote radio site 20 is automatically adjusted to match the time base of the transmitter 41 of the transceiver radio 25 at the central station 15.

In the exemplary embodiment, a 1 kilohertz offset between the output radio frequency carrier $f_1$ of the transmitter 41 at the central station 15 and the radio frequency carrier $f_2$ of the transmitter 60 of the remote transceiver radio 35 will be off approximately 15.625 hertz from the preferred output frequency of the divide by N circuit 85, namely, 109.4375 hertz. The microprocessor 70 detects this variation and makes the compensating adjustment to the time base through the digital potentiometer 87 in order to maintain a relatively constant output frequency in the divide by N circuit 85, namely, 109.4375 hertz frequency output.

The output of the adjusted frequency reference generator 90 is applied to the frequency synthesizer 91. The output of the frequency synthesizer 91 is applied to the transmitter 60 of the remote transceiver radio 35 for transmitting the radio frequency carrier $f_2$ through a suitable power amplifier 61 of the transmitter 60 and the antenna 55. The output frequency of the frequency synthesizer 91 is the same as the radio frequency of the carrier $f_2$ transmitted by the transmitter 76. The digital potentiometer 87 will remain in the adjusted setting whether or not the transmitter 60 is operating.

What is claimed is:

1. A multiple address radio network comprising:
   (a) central radio station for transmitting a first radio frequency carrier;
   (b) a remote radio located at a remote radio site for receiving said first radio frequency carrier from said central radio station and for transmitting a second radio frequency carrier; and
   (c) a frequency calibration circuit connected to said remote radio for sensing frequency offset between said first radio frequency carrier and said second radio frequency carrier at said remote radio site and for adjusting said remote radio at said remote radio site to reduce frequency offset between said first radio frequency carrier and said second radio frequency carrier, said frequency calibration circuit comprising a temperature compensated crystal oscillator adjustable for reducing frequency offset between said first radio frequency carrier and said second radio frequency carrier, said frequency calibration circuit further comprising a microprocessor for detecting and measuring the frequency offset between said first radio frequency carrier and said second radio frequency carrier, and a potentiometer responsive to the output of said microprocessor for adjusting said temperature compensated crystal oscillator to reduce frequency offset between said first radio frequency carrier and said second radio frequency carrier.

2. A multiple address radio network comprising:
   (a) central radio station for transmitting a first radio frequency carrier;
   (b) a remote radio located at a remote radio site for receiving said first radio frequency carrier from said central radio station and for transmitting a second radio frequency carrier; and
   (c) a frequency calibration circuit connected to said remote radio for sensing frequency offset between said first radio frequency carrier and said second radio frequency carrier at said remote radio site and for adjusting said remote radio at said remote radio site to reduce frequency offset between said first radio frequency carrier and said second radio frequency carrier, said frequency calibration circuit comprising a temperature compensated crystal oscillator adjustable for reducing frequency offset between said first radio frequency carrier and said second radio frequency carrier, said frequency calibration circuit further comprising a microprocessor for detecting and measuring the frequency offset between said first radio frequency carrier and said second radio frequency carrier for reducing frequency offset between said first radio frequency carrier and said second radio frequency carrier, said microprocessor automatically calibrates said second radio frequency carrier in response to a plurality of comparisons between successive frequency offsets between said first and second radio frequency carriers exceeding a preselected frequency offset, said comparisons between successive frequency offsets being initiated by a command to send data made by said central radio station.

3. A multiple address radio network comprising:
   (a) a central radio station for transmitting a first radio frequency carrier;
   (b) a remote radio located at a remote radio site for receiving said first radio frequency carrier from said central radio station and for transmitting a second radio frequency carrier;
   (c) a frequency calibration circuit connected to said remote radio for sensing frequency offset between said first radio frequency carrier and said second radio frequency carrier at said remote radio site and for adjusting said remote radio at said remote radio site to reduce frequency offset between said first radio frequency carrier and said second radio frequency carrier, said frequency calibration circuit comprising a temperature compensated crystal oscillator adjustable for reducing frequency offset between said first radio frequency carrier and said second radio frequency carrier, said frequency calibration circuit further comprising a microprocessor for detecting and measuring the frequency offset between said first radio frequency carrier and said second radio frequency carrier for reducing frequency offset between said first radio frequency carrier and said second radio frequency carrier, said microprocessor automatically calibrating said second radio frequency carrier in response to a plurality of comparisons between successive frequency offsets between said first and second radio frequency carriers exceeding a preselected frequency offset; and (d) a remote terminal unit connected to said remote radio, said comparisons between successive frequency offsets being initiated by said remote terminal unit keying-in said remote radio.

4. A multiple address radio network comprising:

(a) a central radio station for transmitting a first radio frequency carrier;

(b) a remote radio located at a remote radio site for receiving said first radio frequency carrier from said central radio station and for transmitting a second radio frequency carrier;

(c) an automatic frequency calibration circuit connected to said remote radio for sensing frequency offset between said first radio frequency carrier and said second radio frequency carrier at said remote radio site and for adjusting said remote radio at said remote radio site to reduce frequency offset between said first radio frequency carrier and said second radio frequency carrier, (d) said automatic frequency calibration circuit comprising a microprocessor for detecting and measuring the frequency offset between said first radio frequency carrier and said second radio frequency carrier for reducing frequency offset between said first radio frequency carrier and said second radio frequency carrier, said microprocessor automatically calibrates said second radio frequency carrier in response to a plurality of comparisons between said first and second radio frequency carriers exceeding a preselected frequency offset; and (e) a remote terminal unit connected to said remote radio, said comparisons between successive frequency offsets being initiated by said remote terminal unit keying-in said remote radio.

5. A multiple address radio network comprising:

(a) a central radio station for transmitting a first radio frequency carrier;

(b) a remote radio located at a remote radio site for receiving said first radio frequency carrier and for transmitting a second radio frequency carrier; and (c) an automatic frequency calibration circuit connected to said remote radio for sensing frequency offset between said first radio frequency carrier and said second radio frequency carrier at said remote radio site and for adjusting said remote radio at said remote radio site to reduce frequency offset between said first radio frequency carrier and said second radio frequency carrier, and (d) said automatic frequency calibration circuit comprising a microprocessor for detecting and measuring the frequency offset between said first radio frequency carrier and said second radio frequency carrier for reducing frequency offset between said first radio frequency carrier and said second radio frequency carrier, said microprocessor automatically calibrates said second radio frequency carrier in response to a plurality of comparisons between successive frequency offsets between said first and second radio frequency carriers exceeding a preselected frequency offset, said comparisons between successive frequency offsets being initiated by said central station.

6. A multiple address radio network comprising:

(a) a central radio station for transmitting a first radio frequency carrier;

(b) a remote radio located at a remote radio site for receiving said first radio frequency carrier and for transmitting a second radio frequency carrier;

(c) an automatic frequency calibration circuit connected to said remote radio for sensing frequency offset between said first radio frequency carrier and said second radio frequency carrier at said remote radio site and for adjusting said remote radio at said remote radio site to reduce frequency offset between said first radio frequency carrier and said second radio frequency carrier, and (d) said automatic frequency calibration circuit comprising a microprocessor for detecting and measuring the frequency offset between said first radio frequency carrier and said second radio frequency carrier for reducing frequency offset between said first radio frequency carrier and said second radio frequency carrier; and (e) a remote terminal unit connected to said remote radio, (f) said microprocessor automatically calibrates said second radio frequency carrier in response to a first plurality of comparisons between successive frequency offsets between said first and second radio frequency carriers exceeding a preselected frequency offset, said first comparison between successive frequency offsets being initiated by said remote terminal unit keying-in said remote radio, said microprocessor automatically calibrating said second radio frequency carrier in response to a second plurality of comparisons between said first and second radio frequency carriers exceeding a preselected frequency offset, said second comparisons between successive frequency offsets being initiated by said central radio station.

7. A multiple address radio network comprising:

(a) a central radio station for transmitting a first radio frequency carrier;

(b) a remote radio located at a remote radio site for receiving said first radio frequency carrier from said central radio station and for transmitting a second radio frequency carrier; and (c) an automatic frequency calibration circuit connected to said remote radio for sensing frequency offset between said first radio frequency carrier and said second radio frequency carrier at said remote radio site and for adjusting said remote radio at said remote radio site to reduce frequency offset between said first radio frequency carrier and said second radio frequency carrier, (d) said automatic frequency calibration circuit comprising a microprocessor for detecting and measuring the frequency offset between said first radio frequency carrier and said second radio frequency carrier for reducing frequency offset between said first radio frequency carrier and said second radio frequency carrier, said microprocessor detects and measures the frequency offset between said first radio frequency carrier and said second radio frequency carrier to reduce frequency offset between said first radio frequency carrier and said second radio frequency carrier in response to said first radio frequency carrier being free of data and having a signal strength in excess of a predetermined magnitude.

8. A multiple address radio network as claimed in claim 7 wherein said remote radio comprises a receiver and wherein said microprocessor detects and measures the frequency offset between said first radio frequency carrier and said second radio frequency carrier to reduce frequency offset between said first radio frequency carrier and said second radio frequency carrier in response to said first radio frequency carrier having a signal strength in excess of said predetermined magnitude and said receiver of said remote radio being in a squelch state.

9. A multiple address radio network comprising:
   (a) a central radio station for transmitting a first radio frequency carrier;
   (b) a remote radio located at a remote radio site for receiving said first radio frequency carrier from said central radio station and for transmitting a second radio frequency carrier; and
   (c) an automatic frequency calibration circuit connected to said remote radio for sensing frequency offset between said first radio frequency carrier and said second radio frequency carrier at said remote radio site and for adjusting said remote radio at said remote radio site to reduce frequency offset between said first radio frequency carrier and said second radio frequency carrier,
   (d) said automatic frequency calibration circuit comprising a microprocessor for detecting and measuring the frequency offset between said first radio frequency carrier and said second radio frequency carrier for reducing frequency offset between said first radio frequency carrier and said second radio frequency carrier, said microprocessor detects and measures the frequency offset between said first radio frequency carrier and said second radio frequency carrier in response to said frequency offset being outside of a predetermined frequency range.

10. A radio frequency calibration circuit to reduce frequency offset between a first radio frequency carrier and a second radio frequency carrier comprising:
    (a) a temperature compensated crystal oscillator adjustable for reducing frequency offset between said first radio frequency carrier and said second radio frequency carrier;
    (b) a microprocessor for detecting and measuring the frequency offset between said first radio frequency carrier and said second radio frequency carrier; and
    (c) a potentiometer responsive to the output of said microprocessor for adjusting said temperature compensated crystal oscillator to reduce frequency offset between said first radio frequency carrier and said second radio frequency carrier.

11. A radio frequency calibration circuit as claimed in claim 10 and comprising:
    (a) a frequency synthesizer responsive to the output of said temperature compensated crystal oscillator for producing said second radio frequency carrier; and
    (b) circuit means responsive to said first radio frequency carrier and said second radio frequency carrier for applying to said microprocessor a signal for said microprocessor to detect and measure the frequency offset between said first radio frequency carrier and said second radio frequency carrier.

12. A radio frequency calibration circuit as claimed in claim 11 wherein said circuit means comprises:
    (a) a first mixer circuit responsive to said first radio frequency carrier and said second radio frequency carrier for producing a first intermediate frequency signal; and
    (b) a discriminator circuit responsive to said first intermediate frequency signal for producing a second intermediate frequency signal.

13. A radio frequency calibration circuit as claimed in claim 10 wherein said microprocessor automatically calibrates said second radio frequency carrier in response to a plurality of comparisons between successive frequency offsets between said first and second radio frequency carriers exceeding a preselected frequency offset.

14. A radio frequency calibration circuit as claimed in claim 13 wherein said comparisons between successive frequency offsets being initiated by a command to send data.

15. A radio frequency calibration circuit as claimed in claim 10 for use with a radio having a remote terminal unit and wherein said microprocessor automatically calibrating said second radio frequency carrier in response to a plurality of comparisons between successive frequency offsets between said first and second radio frequency carriers exceeding a preselected frequency offset said comparisons between successive frequency offsets being initiated by said remote terminal unit keying-in said remote radio.

16. A radio frequency calibration circuit as claimed in claim 13 wherein said microprocessor automatically detects and measures the frequency offset between said first radio frequency carrier and said second radio frequency carrier to reduce frequency offset between said first radio frequency carrier and said second radio frequency carrier in response to said first radio frequency carrier having a signal strength in excess of a predetermined magnitude.

17. A radio frequency calibration circuit as claimed in claim 15 wherein said radio comprises a receiver and wherein said microprocessor detects and measures the frequency offset between said first radio frequency carrier and said second radio frequency carrier to reduce frequency offset between said first radio frequency carrier and said second radio frequency carrier in response to said receiver of said radio being in a squelch state.

18. A radio frequency calibration circuit as claimed in claim 13 wherein said microprocessor detects and measures the frequency offset between said first radio frequency carrier and said second radio frequency carrier to reduce frequency offset between said first radio frequency carrier and said second radio frequency carrier in response to said frequency offset being outside of a predetermined frequency range.

19. A multiple address radio network comprising:
    (A) a central radio station for transmitting a first radio frequency carrier;
    (B) a remote radio located at a remote radio site for receiving said first radio frequency carrier from said central radio station and for transmitting a second radio frequency carrier; and
    (C) a frequency calibration circuit connected to said remote radio for adjusting said remote radio to reduce frequency offset between said first radio frequency carrier and said second radio frequency carrier;

(D) said frequency calibration circuit comprising:
(a) a temperature compensated crystal oscillator adjustable for reducing frequency offset between said first radio frequency carrier and said second radio frequency carrier,
(b) a frequency synthesizer responsive to the output of said temperature compensated crystal oscillator for producing a radio frequency signal having a radio frequency the same as said second radio frequency carrier, and
(c) circuit means responsive to said first radio frequency carrier and said frequency synthesizer for applying to said microprocessor a signal for said microprocessor to detect and measure the frequency offset signal between said first radio frequency carrier and said second radio frequency carrier, (E) said circuit means of said frequency calibration circuit comprising:
(a) a first mixer circuit responsive to said first radio frequency carrier and said frequency synthesizer for producing a first intermediate frequency signal,
(b) a discriminator circuit responsive to said first intermediate frequency signal for producing a second intermediate frequency signal,
(c) a first divisor circuit responsive to said second intermediate frequency signal for producing a first divided frequency signal,
(d) a local oscillator for producing a signal,
(e) a second mixer circuit responsive to said first divisor circuit and responsive to the signal produced by said local oscillator for producing a signal representative of the frequency offset, and
(f) a second divisor circuit responsive to the signal produced by said second mixer circuit for applying to said microprocessor a signal representing the frequency offset for said microprocessor to detect and measure the frequency offset between said first radio frequency carrier and said second radio frequency carrier.

20. A radio frequency calibration circuit to reduce frequency offset between a first radio frequency carrier and a second radio frequency carrier comprising:

(A) a temperature compensated crystal oscillator adjustable for reducing frequency offset between said first radio frequency carrier and said second radio frequency carrier;

(B) a microprocessor for detecting and measuring the frequency offset between said first radio frequency carrier and said second radio frequency carrier;

(C) a potentiometer responsive to the output of said microprocessor for adjusting said temperature compensated crystal oscillator to reduce frequency offset between said first radio frequency carrier and said second radio frequency carrier;

(D) a frequency synthesizer responsive to the output of said temperature compensated crystal oscillator for producing said second radio frequency carrier; and (E) circuit means responsive to said first radio frequency carrier and said second radio frequency carrier for applying to said microprocessor a signal for said microprocessor to detect and measure the frequency offset between said first radio frequency carrier and said second radio frequency carrier, (F) said circuit means comprising:
(a) a first mixer circuit responsive to said first radio frequency carrier and said second radio frequency carrier for producing a first intermediate frequency signal,
(b) a discriminator circuit responsive to said first intermediate frequency signal for producing a second intermediate frequency signal,
(c) a first divisor circuit responsive to said second intermediate frequency signal for producing a first divided frequency signal,
(d) a local oscillator for producing a signal,
(e) a second mixer circuit responsive to said first divisor circuit and responsive to the signal produced by said local oscillator for producing a signal representative of the frequency offset, and
(f) a second divisor circuit responsive to the signal produced by said second mixer circuit for applying to said microprocessor a signal representing the frequency offset for said microprocessor to detect and measure the frequency offset between said first radio frequency carrier and said second radio frequency carrier.

21. A radio frequency calibration circuit to reduce frequency offset between a first radio frequency carrier and a second radio frequency carrier comprising:

(A) a temperature compensated crystal oscillator adjustable for reducing frequency offset between said first radio frequency carrier and said second radio frequency carrier;

(B) a microprocessor for detecting and measuring the frequency offset between said first radio frequency carrier and said second radio frequency carrier; and (C) circuit means responsive to said first radio frequency carrier and said second radio frequency carrier for applying to said microprocessor a signal for said microprocessor to detect and measure the frequency offset between said first radio frequency carrier and said second radio frequency carrier, (D) said circuit means comprising:
(a) a first mixer circuit responsive to said first radio frequency carrier and said second radio frequency carrier for producing a first intermediate frequency signal,
(b) a discriminator circuit responsive to said first intermediate frequency signal for producing a second intermediate frequency signal,
(c) a first divisor circuit responsive to said second intermediate frequency signal for producing a first divided frequency signal,
(d) a local oscillator for producing a signal,
(e) a second mixer circuit responsive to said first divisor circuit and responsive to the signal produced by said local oscillator for producing a signal representative of the frequency offset, and
(f) a second divisor circuit responsive to the signal produced by said second mixer circuit for applying to said microprocessor a signal representing the frequency offset for said microprocessor to detect and measure the frequency offset between said first radio frequency carrier and said second radio frequency carrier.

* * * * *